March 25, 1969 A. W. NELSON 3,434,607
AUTOMOBILE TOWING DEVICE
Filed Jan. 24, 1967

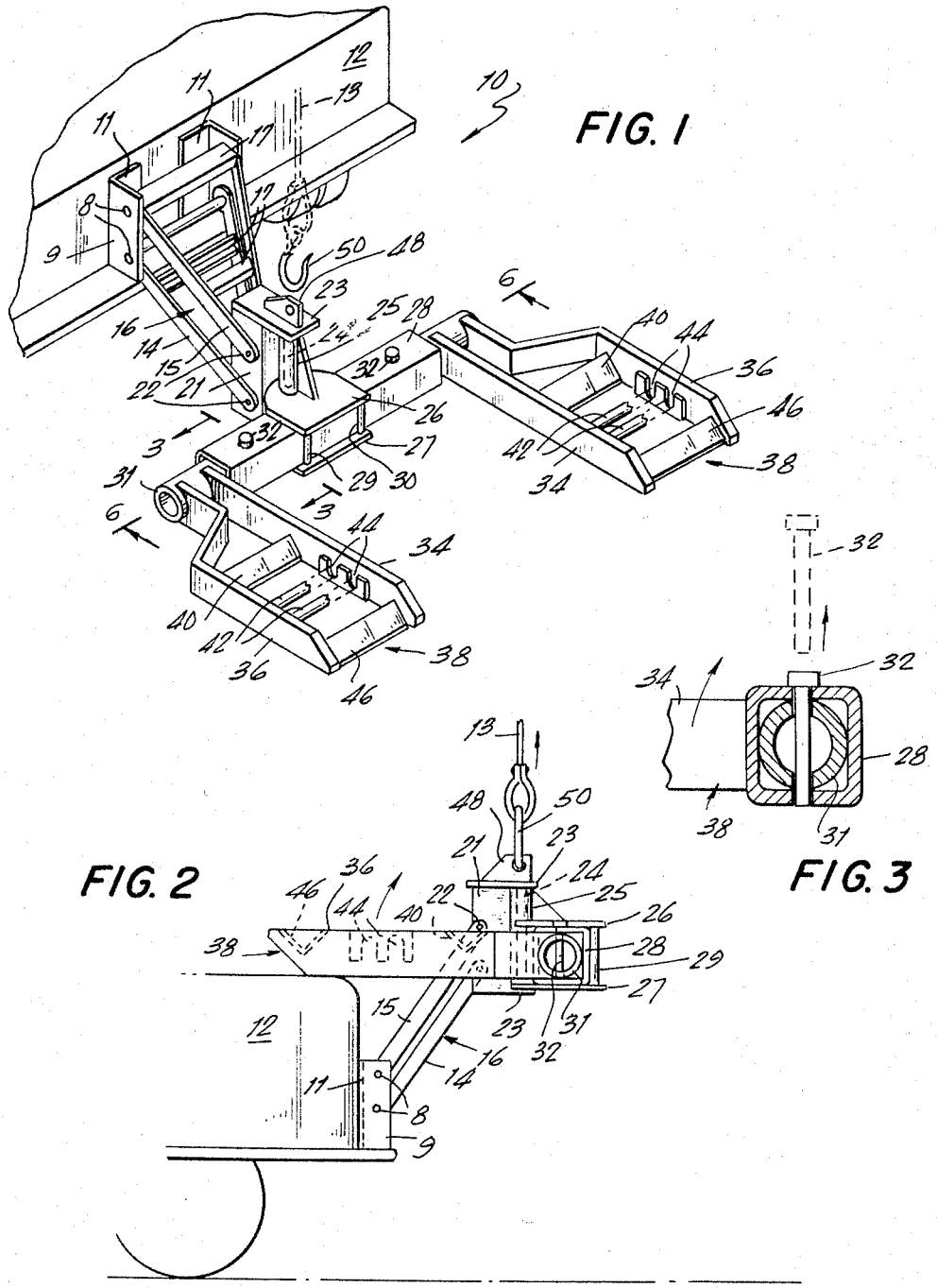

INVENTOR.
ARTHUR W. NELSON
BY
Friedman & Goodman
ATTORNEYS

United States Patent Office 3,434,607
Patented Mar. 25, 1969

3,434,607
AUTOMOBILE TOWING DEVICE
Arthur W. Nelson, 276 Long Island Ave.,
Wyandanch, N.Y. 11798
Filed Jan. 24, 1967, Ser. No. 611,386
Int. Cl. B66c 1/22; B62d 53/04; B60d 1/14
U.S. Cl. 214—86                               4 Claims

ABSTRACT OF THE DISCLOSURE

This invention and this disclosure are directed to an improved automobile towing device in which the means for receiving the part of the automobile to be towed e.g. the tires and wheels is attached to the support on the towing vehicle by a novel coupling means which allows the receiving means to be raised in a position and rotated forwardly so as not to constitute a safety hazard or make maneuvering of the towing vehicle difficult due to the rearward projection of the receiving means. This coupling means is provided with a rotatable member receiving means e.g. a hollow tube which receives telescopically a rotating member of the device or part employed to receive the part of the towed vehicle.

Background of the invention

Automobile towing devices include a support usually rigidly affixed to the tow truck and rearwardly thereof an assembly for receiving the disabled or damaged car to be towed. The distance most rearward end of the receiving assembly varies but is usually many feet. This extension impairs the ability of the truck driver to maneuver in traffic when the towing device is not in use. In addition it represents a safety problem in that a person walking around the truck can trip over the extending receiving means. Hence, it has been desired to provide a towing device which when out of service permits revolution of the receiving means over the back of the tow truck. For safety and convenience sake, the receiving means should remain as permanently affixed to the support means as possible especially when in the forward position. Otherwise the rotated receiving means is in an unsteady and precarious position. This occurs when the receiving means is at least partially detached from the support means when rotated forwardly.

Objects of the invention

It is an object of this invention to provide a towing device which permits rotation of the towed vehicle receiving means upward and forward to a position over the towing vehicle.

It is another object of this invention to provide such a towing device in which the receiving means is permanently affixed at all times to the support means affixed rigidly to the towing vehicle and is not partially detached therefrom when revolved to the forward position.

These and other objects of my invention will become apparent from the following complete description, drawing and claims.

Summary of the invention

This invention is directed to an improvement in an automobile towing device which includes a support means for rigid attachment to the rear of a towing vehicle and receiving means for receiving a part of a towed vehicle, the receiving means including a rotatable member. The improvement resides in a coupling for affixing the receiving means to the support means, the coupling comprising at least two arms pivotally connected to the support means and permanently pivotally connected to a rotatable member receiving means. The rotatable member of the receiving means is maintained in the rotatable member receiving means in a fixed and rotatable position.

Brief description of the drawing

The invention will be best understood by reference to the drawings in which:

FIGURE 1 is an isometric view of the towing device of the present invention mounted upon a tail-gate of a towing vehicle.

FIGURE 2 is a side elevation of the towing device of the invention in rotated, upward and forward position.

FIGURE 3 is a sectional view taken along the line 3—3 of FIGURE 1.

Description of preferred embodiment

Figure 4:
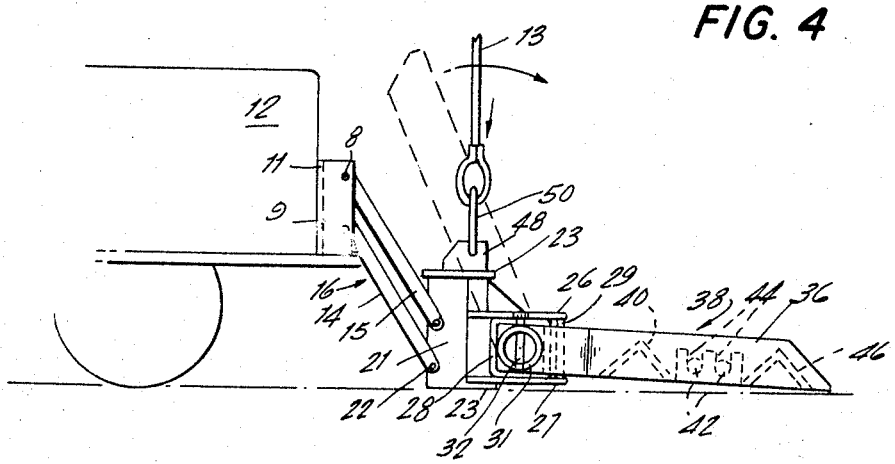
FIGURE 4 is a side elevation of the towing device of the invention in position to receive a towed vehicle. Rotation of the receiving means is shown in phantom.

Referring to the drawing which illustrates a preferred embodiment of this invention, the towing device comprising the present invention designated generally by the numeral 10, comprises a pair of vertically disposed angular bars 11, mounted in spaced relationship upon the tail-gate of a towing vehicle 12 by any suitable means, such as: welding, riveting, or by means of bolts. The towing vehicle 12 is of a conventional type and is provided with a derrick or crane, not shown, from which a lifting cable 13 is suspended and adapted to be raised and lowered as required in use. The angle bars 11 form a rigid supporting means or structure for the device. A pair of arms 14 and 15 extend horizontally from the base angle bars 11 and comprise side bars 16, which are interconnected by means of transverse braces 17. The transverse braces 17 are advantageously formed of angle bars which are welded to the side bars 16 in the region of their terminal portions. The arms 14 and 15 are pivotally connected in an aligned position with vertical link 21 having planar side walls with registering apertures within which pivot pins 22 are received. The pivot pins 22 extend through similar registering apertures formed in the rearward portion of arms 14 and 15. The forward portions of arms 14 and 15 are pivotally connected to sideplate 9 via pin 8 passing into brace 17 making brace 17 and arms 15 pivotally connected to sideplate 9. Arm 14 is pivotally connected via pivot pin 20.

It is apparent, therefore, that a parallelogram type linkage is established whereby the pivotal connection of the horizontally extending arms with the vertical link 21 limit the movement of the vertical link to a vertical plane and maintain it in substantial parallelism with angle bars 11. A pair of tie plates 23 are secured to the upper and lower vertical extremities of vertical link 21 as by welding and overlie the extremities. The tie plates 23 extend horizontally rearwardly of the parallelogram linkage system and are secured to the extremities of pivot post 24. Vertically disposed pivot post 24 not seen but shown in FIGURE 1 by dotted lines, advantageously comprises a solid steel cylindrical bar, is axially aligned with the axis of the vertical link and is fixedly maintained in parallel spaced relationship thereto by means of said horizontal tie plates 23. Pivot post 24 is surrounded by a cylindrical sleeve 25 which is rotatably mounted thereon. The lower portion of cylindrical sleeve 25 has secured thereto horizontally extending socket plates 26 and 27. Socket plates 26 and 27 are advantageously formed of sheet steel, each provided with an aperture within which sleeve 25 is received and to which it is secured as by means of a circumferential weld. Socket plates 26 and 27 are of a substantially similar configuration and are disposed in a horizontal plane in vertical parallel spaced relation to each other. The plates extend rearwardly and are spaced to accommodate a rotatable member receiving means in the form of a tube 28 having rectangular or cylindrical interior walls, preferably cylindrical, forward of securing pins 29 and 30. Tube 28 is provided with an aperture on either side of vertical link 21 which is in registry with rotatable member 31 maintained in fixed but rotatable position within tube 28. On either extremity of rotatable member 31 there is provided a receiving means more fully described below for receiving the portion of the vehicle to be towed. A locking pin 32 is provided to pass through the apertures in tube 28 and rotatable member 31 in registry. Removal of pin 32 enables rotation of rotatable member 31 within tube 28 and thereby rotation of the entire receiving means of which rotatable member 31 is a part.

The receiving means comprises inside walls 34, generally parallel, and outside walls 36 thereby defining receiving means base 38. Mounted rigidly on base 38 are triangular tire restraining means 40 and rotatable tire mounts 42 mounted in generally U shaped slots 44. A triangular rearward restraining means 46 is provided on base 38.

Rigidly affixed to the upper horizontal tie plate 23 is lifting lug 48 comprising an apertured vertically disposed steel plate adapted to receive hook 50 secured to lifting cable 13. By this means, the apex portion of the device, including the movable link and pivotally mounted socket plates, are raised or lowered as required. The parallelogram linkage arrangement maintains the vertical link and pivot post in a substantially horizontal disposition. Furthermore, it will be apparent that by reason of the rotatable mounting of the cylindrical sleeve, the entire socket arrangement may be pivoted on the vertical axis of the pivot post 24 in a horizontal plane.

Figure 5:
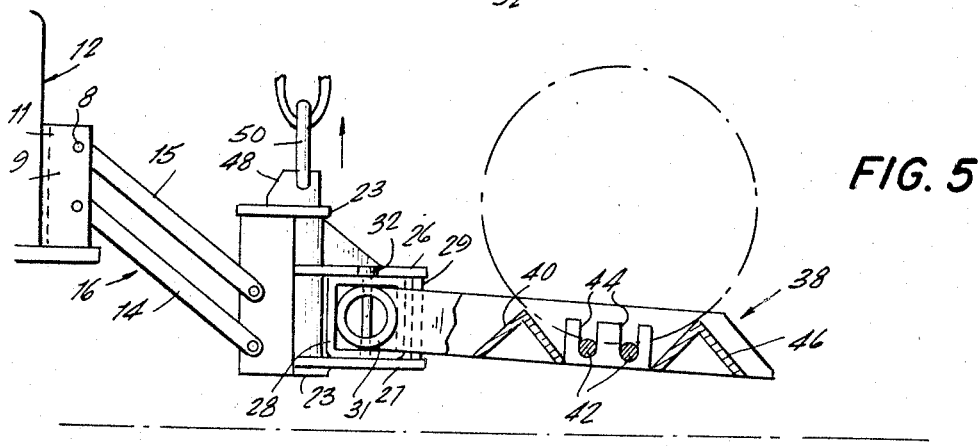
FIGURE 5 is a side elevation of the towing device in operation i.e. in towing position. It is raised sufficiently to tow a disabled automobile.
Figure 6:
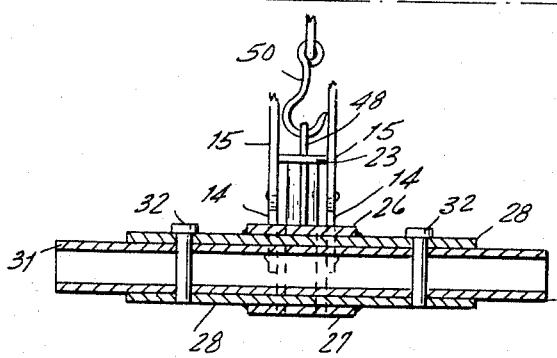
FIGURE 6 is a sectional view taken along the line 6—6 of FIGURE 1.

The operation of the apparatus is simple. The vertical link 21 is lowered by crane lowering the entire assembly with the receiving means extending rearwardly. The towed vehicle's tires are placed on the tire mounts and the crane raises the vertical link 21 to the position shown in FIGURE 5. The towing vehicle truck 12 moves forward thereby towing the towed vehicle. When it reaches it destination the receiving assembly is lowered by releasing the lifting cable 13 sufficient to lower base 38 to the ground. The disabled or damaged auto is removed and the crane is started to raise the vertical link to the position shown in FIGURE 2, the pin 32 is removed from out of the apertures in tube 28 and rotatable member 31 is rotated counter clockwise so that the receiving means or assembly is disposed over the towing vehicle extending forwardly. This is done without detaching the receiving assembly even partially from the securing means rigidly affixed to the towing vehicle. The pin is reinserted into the aperture in tube 28 which aperture is in registry with a second aperture in rotatable member 31 opposite the first mentioned aperture i.e. 180° therefrom. Thus the receiving assembly is disposed in a secure and safe manner over the towing vehicle thereby facilitating handling the towing vehicle when the automobile towing device is not in use.

I have here shown and described a preferred embodiment of my invention. It will be apparent however, that this invention is not limited to the embodiment shown and described as various modifications of the embodiment, or portions thereof, may be made without departing from the spirit and scope of the invention.

What is claimed is:

1. In a towing device including supporting means for rigid attachment to the rear of a towing vehicle, rotatable member receiving means, receiving means including a rotatable member, said receiving means adapted to receive a part of a towed vehicle, the improvement which comprises a coupling for affixing said rotatable member receiving means to said support means, said coupling comprising at least two pairs of arms pivotally connected to said support means and permanently pivotally connected to a vertical link holding said rotatable member receiving means, said rotatable member maintained in said rotatable member receiving means in a fixed towing position or a rotated stored position and means for maintaining said rotatable member in the fixed or stored position.

2. An improvement in accordance with claim 1 wherein said rotatable member receiving means has cylindrical interior walls.

3. In a towing device including supporting means for rigid attachment to the rear of a towing vehicle, receiving means including a rotatable member, said receiving means adapted to receive a part of a towed vehicle, the improvement which comprises a coupling for affixing said receiving means to said support means, said coupling comprising at least two pairs of arms pivotally connected to said support means and permanently pivotally connected to a vertical link holding a rotatable member receiving means, said rotatable member maintained in said rotatable member receiving means in fixed and rotatable position by virtue of said rotatable member having a pair of opposite disposed apertures adapted to be in registry with an aperture in the rotatable member receiving means and a pin passing through each of said apertures to maintain them in the fixed position.

4. An improvement in accordance with claim 3 wherein the rotatable member receiving means has planar exterior walls and is rigidly affixed to a pair of horizontally extending socket plates.

References Cited

UNITED STATES PATENTS

| | | |
|---|---|---|
| 1,520,194 | 12/1924 | Matthews. |
| 2,183,478 | 12/1939 | Holmes et al. |
| 2,795,435 | 6/1957 | Ortiz et al. _____ 280—493 XR |
| 3,051,337 | 8/1962 | Nelson. |

ALBERT J. MAKAY, *Primary Examiner.*

U.S. Cl. X.R.

280—402, 492